(12) United States Patent
Gallivanoni et al.

(10) Patent No.: US 12,058,797 B2
(45) Date of Patent: Aug. 6, 2024

(54) SYSTEM AND METHOD FOR IDENTIFYING COOKWARE ITEMS PLACED ON AN INDUCTION COOKTOP

(71) Applicant: WHIRLPOOL CORPORATION, Benton Harbor, MI (US)

(72) Inventors: Andrea Gallivanoni, Casorate Sempione (IT); Cristiano Vito Pastore, Comerio (IT); Federica Inderst, Saronno (IT)

(73) Assignee: Whirlpool Corporation, Benton Harbor, MI (US)

( * ) Notice: Subject to any disclaimer, the term of this patent is extended or adjusted under 35 U.S.C. 154(b) by 721 days.

(21) Appl. No.: 16/946,098

(22) Filed: Jun. 5, 2020

(65) Prior Publication Data
US 2021/0385913 A1   Dec. 9, 2021

(51) Int. Cl.
| | |
|---|---|
| *H05B 6/06* | (2006.01) |
| *F24C 7/08* | (2006.01) |
| *G01B 7/02* | (2006.01) |
| *G01D 5/20* | (2006.01) |
| *H05B 6/12* | (2006.01) |

(52) U.S. Cl.
CPC ............. *H05B 6/065* (2013.01); *F24C 7/083* (2013.01); *G01B 7/02* (2013.01); *G01D 5/20* (2013.01); *H05B 6/1272* (2013.01); *H05B 2213/03* (2013.01); *H05B 2213/05* (2013.01)

(58) Field of Classification Search
CPC ...... H05B 6/065; H05B 6/062; H05B 6/1272; H05B 2213/03; H05B 2213/05; F24C 7/083; G01B 7/004; G01B 7/02; G01D 5/20
See application file for complete search history.

(56) References Cited

U.S. PATENT DOCUMENTS

| | | |
|---|---|---|
| 6,614,006 B2 | 9/2003 | Pastore et al. |
| 6,870,138 B2 | 3/2005 | Pastore |
| 6,930,287 B2 | 8/2005 | Gerola et al. |
| 8,742,299 B2 | 6/2014 | Gouardo et al. |

(Continued)

FOREIGN PATENT DOCUMENTS

| | | | | |
|---|---|---|---|---|
| CN | 105574843 A | * | 5/2016 | |
| DE | 102009029250 A1 | * | 3/2011 | .............. H02J 50/10 |

(Continued)

*Primary Examiner* — Helena Kosanovic
*Assistant Examiner* — Thao Uyen Tran-Le
(74) *Attorney, Agent, or Firm* — Price Heneveld LLP

(57) ABSTRACT

A method is provided for identifying cookware items placed on top of an induction cooktop having a plurality of coils. The method includes the following steps: acquire coverage factor information for each coil and collect it into a matrix; identify all local maxima in the matrix; find the coordinates of each of the local maxima as follows: when the local maxima is a single coil, the coordinates are those of the coil center, and when the local maxima is a region of contiguous coils, the coordinates are those of a centroid of the region; calculate distances from each coil to each of the coordinates of the identified local maxima; determine a minimum among the distances; classify the coils in clusters, based on the distances from the local maxima; and use the identified coil clustering to estimate the position, shape, size, and orientation of the cookware items.

18 Claims, 14 Drawing Sheets

(56) References Cited

U.S. PATENT DOCUMENTS

| | | | |
|---|---|---|---|
| 9,204,499 B2 | 12/2015 | Kim et al. | |
| 9,585,200 B2 | 2/2017 | Christiansen et al. | |
| 10,009,960 B2 | 6/2018 | Artal Lahoz et al. | |
| 10,244,584 B2 | 3/2019 | Fattorini et al. | |
| 2012/0024835 A1* | 2/2012 | Lahoz | H05B 6/065 |
| | | | 219/385 |
| 2017/0142783 A1* | 5/2017 | Herzog | H05B 6/1254 |
| 2020/0367326 A1* | 11/2020 | Moliner | H05B 6/1254 |

FOREIGN PATENT DOCUMENTS

| | | | | |
|---|---|---|---|---|
| EP | 2112865 A2 | 10/2009 | | |
| EP | 1575336 B1 * | 1/2010 | | H05B 6/1245 |
| EP | 2445310 A2 | 4/2012 | | |
| EP | 2242328 B1 | 6/2012 | | |
| EP | 2445305 B1 | 3/2015 | | |
| EP | 2034799 B1 | 5/2015 | | |
| EP | 2242329 B1 | 7/2015 | | |
| EP | 2914060 A1 | 9/2015 | | |
| EP | 3307018 B1 | 3/2019 | | |
| ES | 2396077 A1 * | 2/2013 | | G06T 11/206 |
| ES | 2396077 B1 * | 11/2013 | | G06T 11/206 |
| JP | 2010153060 A * | 7/2010 | | |

* cited by examiner

SYSTEM AND METHOD FOR IDENTIFYING COOKWARE ITEMS PLACED ON AN INDUCTION COOKTOP

BACKGROUND OF THE DISCLOSURE

The present disclosure generally relates to a system and method for identifying cookware items placed on an induction cooktop.

SUMMARY OF THE DISCLOSURE

According to one aspect of the present disclosure, a method is provided for identifying cookware items placed on top of an induction cooktop having a plurality of coils, comprising the following steps: a) acquire information related to the coverage factor for each coil and collect it into a coverage factor matrix; b) identify all local maxima in the coverage factor matrix; c) find the coordinates of each of the local maxima as follows: i) when the local maxima is a single coil, the coordinates are those of a center of a single coil, and ii) when the local maxima is a region of contiguous coils, the coordinates are those of a centroid of the region; d) calculate distances from each coil to each of the coordinates of the identified local maxima; e) for each coil, determine a minimum among the distances; f) classify the coils in clusters, based on the distances from the local maxima; and g) use the identified coil clustering to estimate the position, shape, size, and orientation of the cookware items.

According to another aspect of the present disclosure, an induction cooktop system is provided comprising: an induction cooktop including a plurality of inductive coils; a power supply for supplying power to selected ones of the plurality of inductive coils; and a controller for identifying cookware items placed on top of the induction cooktop, estimating the position, shape, size, and orientation of the cookware items, and controlling the amount of power supplied to the selected ones of the plurality of inductive coils, the controller being programmed to perform at least the following steps: a) acquire information related to the coverage factor for each coil and collect it into a coverage factor matrix; b) identify all local maxima in the coverage factor matrix; c) find the coordinates of each of the local maxima as follows: i) when the local maxima is a single coil, the coordinates are those of a center of a single coil, and ii) when the local maxima is a region of contiguous coils, the coordinates are those of a centroid of the region; d) calculate distances from each coil to each of the coordinates of the identified local maxima; e) for each coil, determine a minimum among the distances; f) classify the coils in clusters, based on the distances from the local maxima; and g) use the identified coil clustering to estimate the position, shape, size, and orientation of the cookware items.

According to yet another aspect of the present disclosure, a method is provided for identifying cookware items placed on top of an induction cooktop having a plurality of coils, comprising the following steps: a) acquire information related to the coverage factor for each coil and collect it into a coverage factor matrix; b) identify all local maxima in the coverage factor matrix; c) find the coordinates of each of the local maxima as follows: i) when the local maxima is a single coil, the coordinates are those of a center of a single coil, and ii) when the local maxima is a region of contiguous coils, calculating the coordinates of a centroid of the region using the formulas:

$$x_c = \frac{1}{N}\sum_{k=1}^{N} x_i \cdot c_i \quad y_c = \frac{1}{N}\sum_{k=1}^{N} y_i \cdot c_i$$

where $x_c$, $y_c$ are the coordinates of the centroid, N is the number of coils considered in the calculation for this particular centroid, $x_i$, $y_i$ are the coordinates of the ith coil, and $c_i$ the coverage factor for the ith coil; d) calculate distances from a center of each coil to each of the coordinates of the identified local maxima; e) for each coil, determine a minimum among the distances; f) classify the coils in clusters, based on the distances from the local maxima; and g) use the identified coil clustering to estimate the position, shape, size, and orientation of the cookware items.

These and other features, advantages, and objects of the present disclosure will be further understood and appreciated by those skilled in the art by reference to the following specification, claims, and appended drawings.

Figure 1:
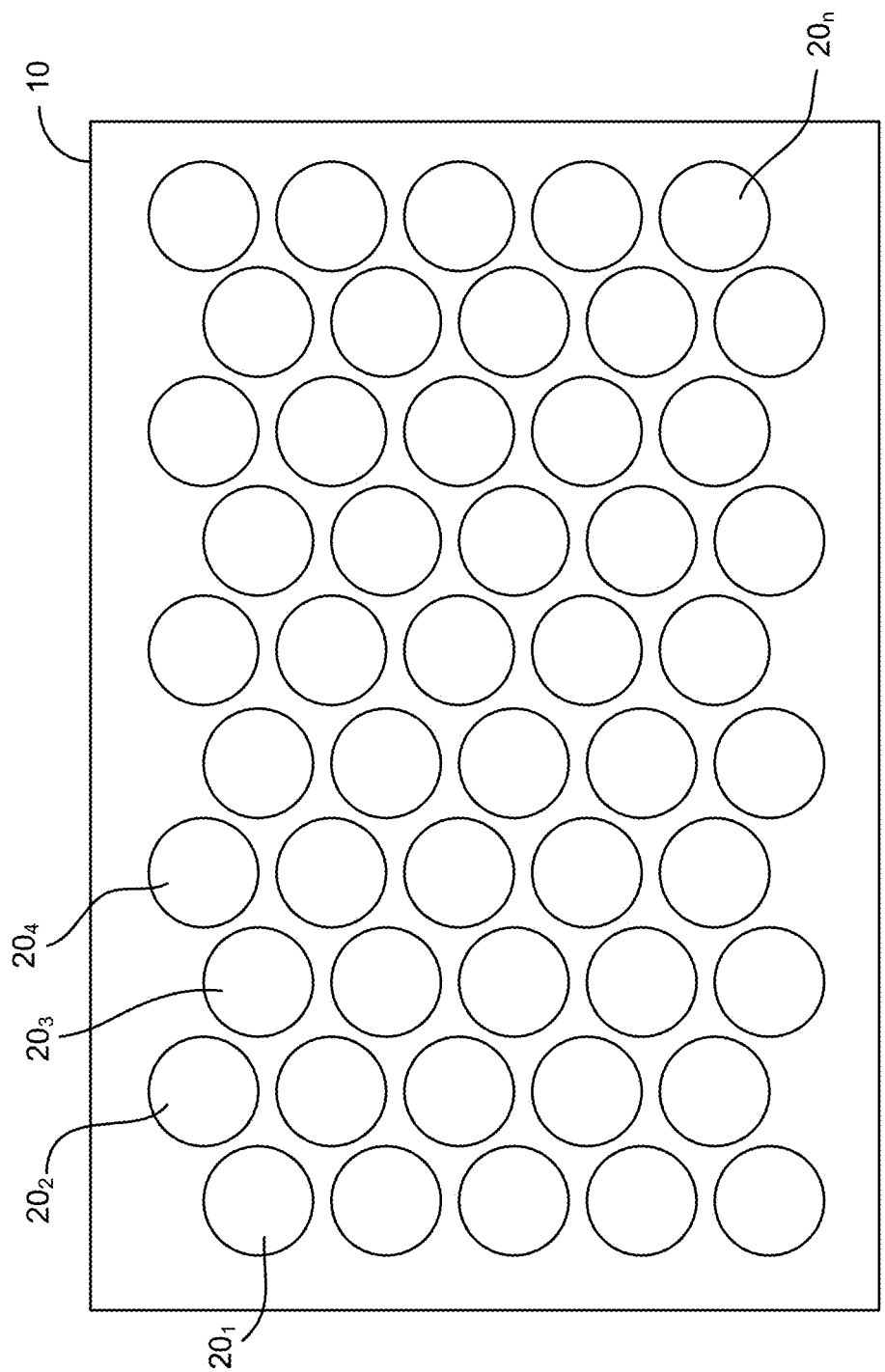
FIG. 1 is a top view of an induction cooktop having an array of coils.

The components in the figures are not necessarily to scale, emphasis instead being placed upon illustrating the principles described herein.

DETAILED DESCRIPTION

The present illustrated embodiments reside primarily in combinations of method steps and apparatus components related to an induction cooktop. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The method described below aims at determining the position, size, shape, and orientation of a number of cookware items such as pots, placed over a flexible induction cooktop. This information can be later used in order to display, on a user interface, the cookware items recognized by the system, so that the user can select a desired first power level for each cookware item. Furthermore, the system can use the first power level selected by the user to derive a second power level for each coil belonging to a cluster associated with the corresponding cookware item, in order to control the power delivered to each of the said coils. FIG. 1 shows an induction cooktop 10 characterized by having a large number of coils $20_1$-$20_n$, whose dimensions are typically smaller than the size of a cookware item, and these coils $20_1$-$20_n$ are distributed next to each other to form mono-dimensional or bi-dimensional arrays.

When conventional cookware item detection techniques are applied to each individual coil $20_1$-$20_n$, either a discrete YES/NO or a continuous coverage factor information is available for each coil $20_1$-$20_n$, but unfortunately this information is not sufficient to determine the number, position, size, shape, and orientation of cookware items laid over the induction cooktop 10.

Regarding conventional pan detection techniques, ES2362839/EP2242328 from Bosch Siemens essentially proposes to generate a first image whose "pixels" are representing the coverage factor in response of the overlying pots. Then it proposes to identify a cohesive (i.e. contiguous) area made of neighboring cells having a coverage factor larger than a predetermined threshold. Finally, it is proposed to apply a separation algorithm aimed at differentiating whether the contiguous area corresponds to one pot or to multiple pots close to each other. The proposed method in ES2362839/EP2242328 is known to provide inaccurate results whenever the heating cell dimension is not sufficiently small compared to the size of the pot.

It is also known to first determine a cell covered by a pot and then perform a selective search in a neighborhood of that cell, through a set of additional sensors. An example of this method is disclosed in EP2112865.

Figure 2A:
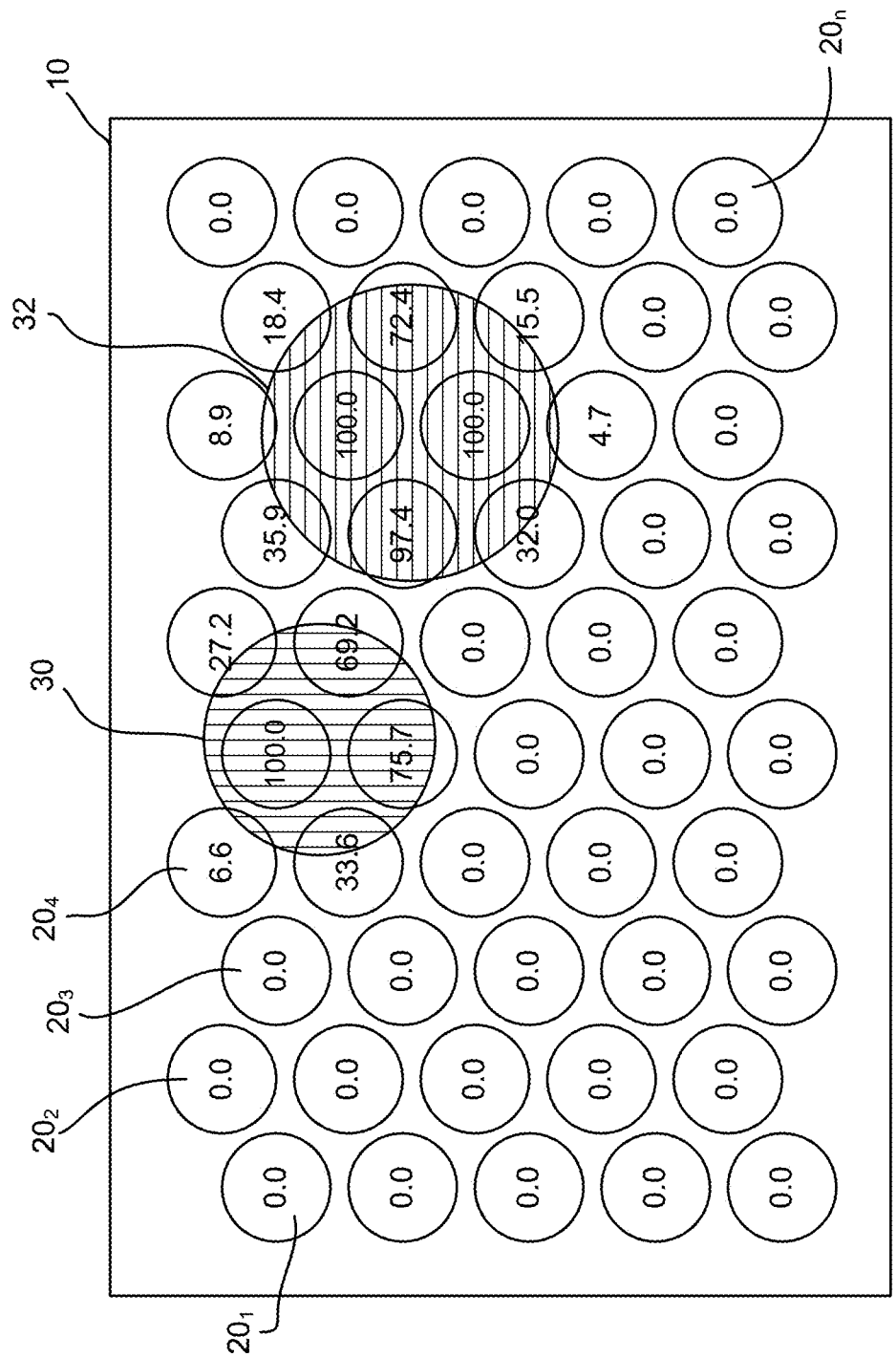
FIG. 2A is a top view of the induction cooktop of FIG. 1 shown with two cookware items thereon with the coverage factors of each coil indicated.
Figure 2B:
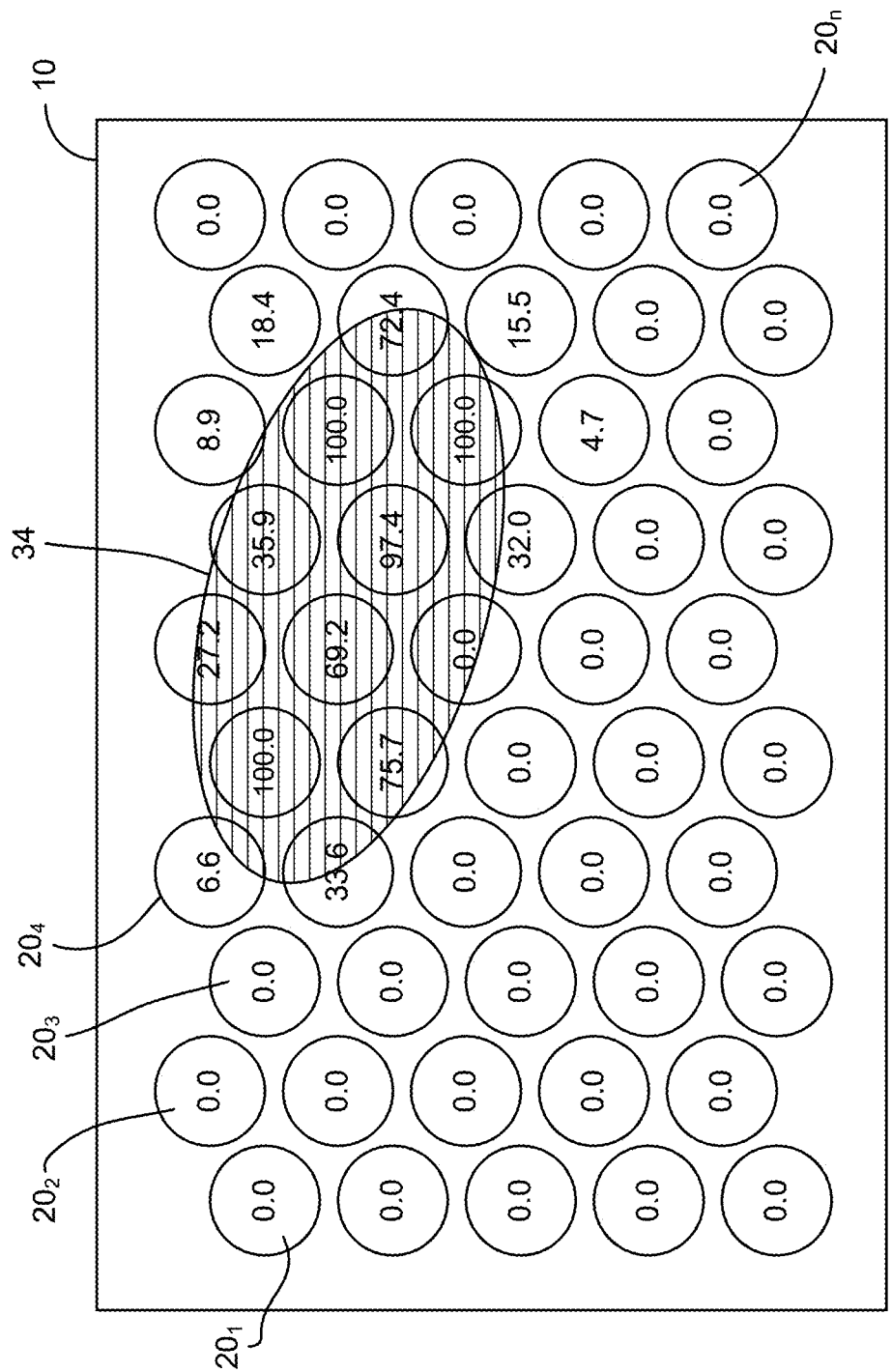
FIG. 2B is a top view of the induction cooktop of FIG. 1 shown with an incorrect estimate of the size, shape, orientation, and position of the cookware items shown in FIG. 2A.

FIG. 2A shows actual cookware items 30 and 32 placed on top of a flexible induction cooktop 10. FIG. 2B shows a single elliptical pot 34 is incorrectly identified instead of two circular ones, since the cookware items 30 and 32 are too close to each other. The number inside each coil displays the corresponding coverage factor. In particular cases, when the cookware items 30 and 32 are really close to each other, the set of activated coils can be confused with the one activated by an oval pot 34. The objective of the present method is to provide a method for cookware item identification and estimation able to identify individual cookware items 30 and 32 as distinct items.

Figure 3:
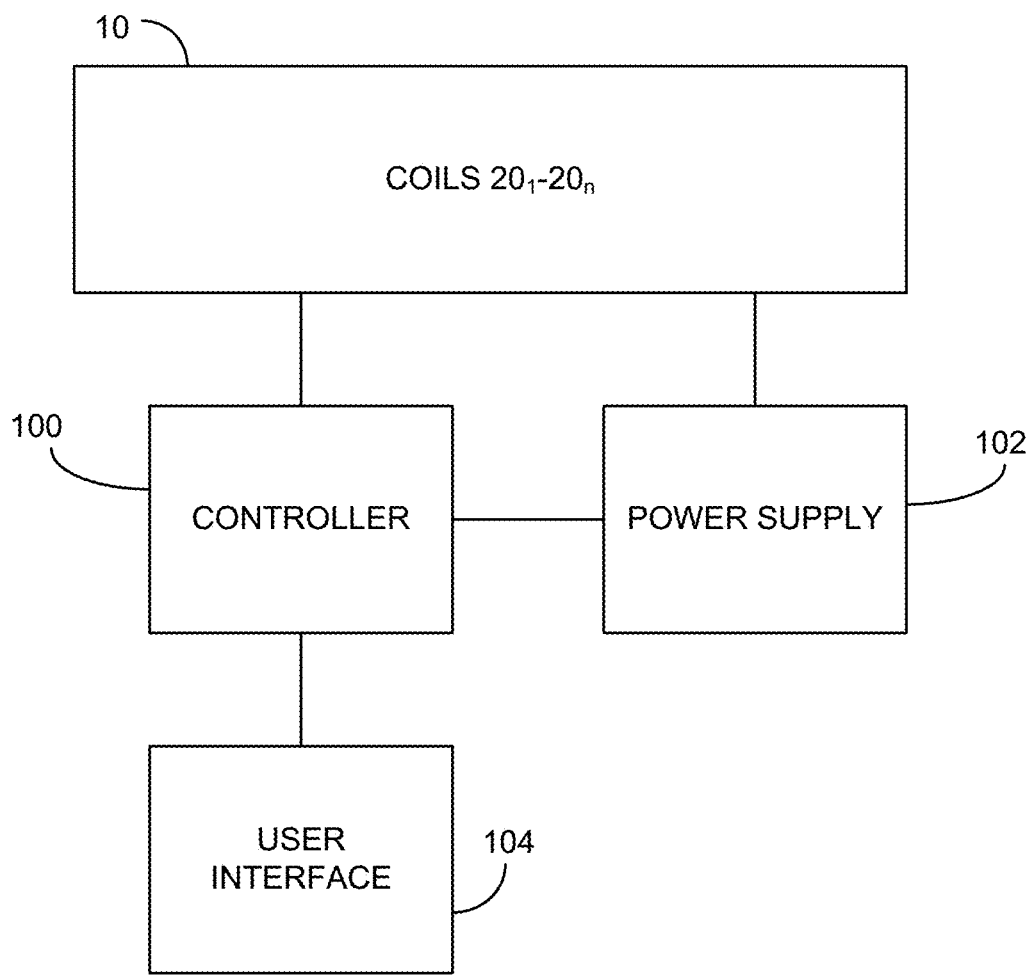
FIG. 3 is an electrical circuit diagram in block form of an induction cooktop system using the induction cooktop of FIG. 1.

FIG. 3 shows a block diagram of the basic electrical components of an induction cooktop system 5. A controller 100, such as a microprocessor or the like, is coupled to each of the coils $20_1$-$20_n$ of the induction cooktop 10 and to a power supply 102 and a user interface 104. In general, the controller 100 will respond to activation of an input on the user interface 104 to detect the presence, size, shape, orientation, and position of any cookware items 30 and 32 on the induction cooktop 10 using the method described below. Once the size, shape, orientation, and position of any cookware items 30 and 32 are identified, the controller 100 will control the power supply 102 to supply an appropriate power level to the coils $20_1$-$20_n$ underlying the cookware items 30 and 32 in order to heat food in the cookware items 30 and 32.

The user interface 104 may be any conventional user interface and may include various inputs such as temperature settings and timers or the like.

Figure 4:
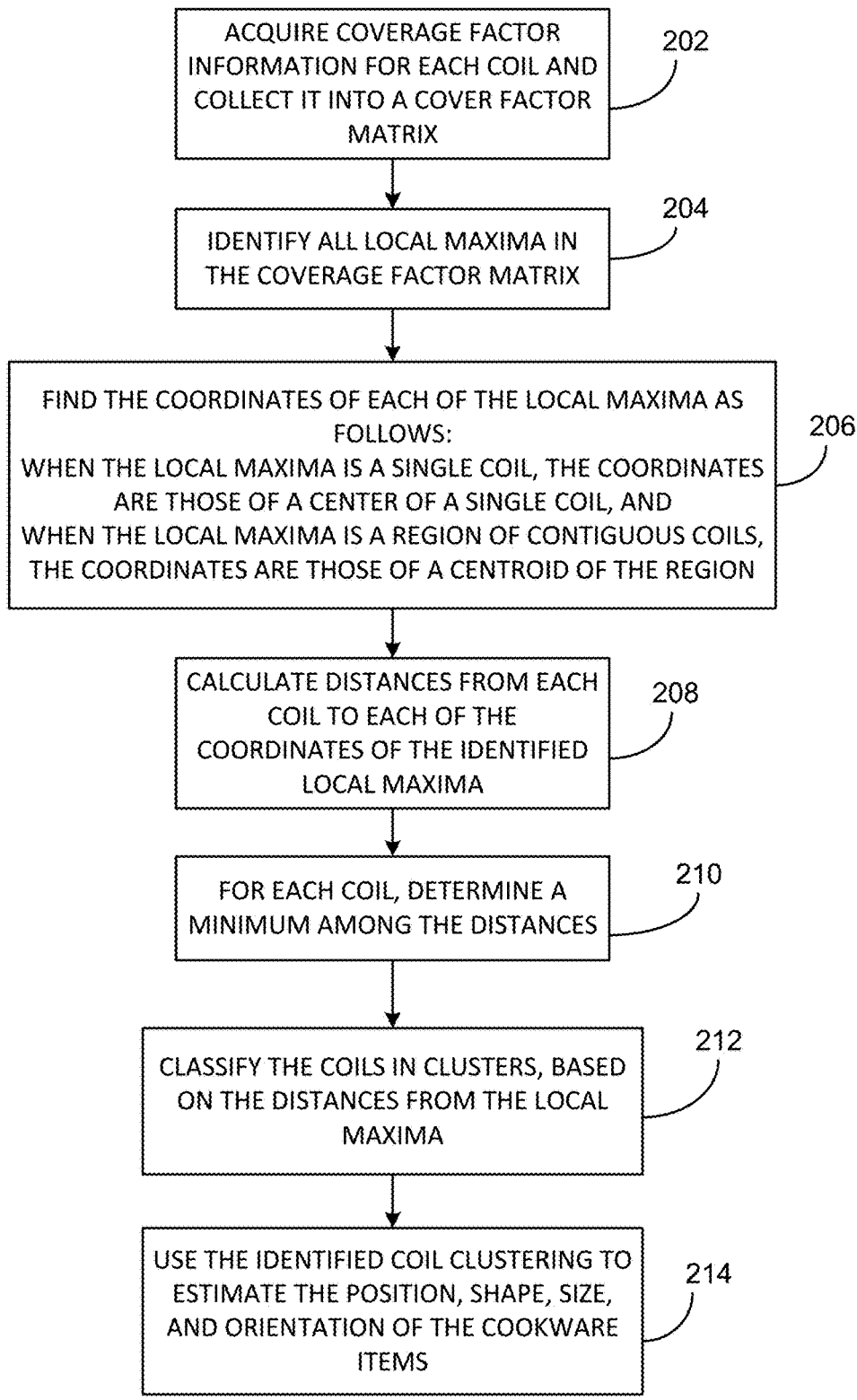
FIG. 4 is a flow chart of an algorithm executed by the controller in FIG. 3.

A method 200 described herein is shown in FIG. 4 and may be implemented as an algorithm executed by the controller 100. The method 200 has a preliminary step 202 in the acquisition of a matrix of information related to the coverage factors, each element of the matrix corresponding to one coil $20_1$-$20_n$. The particular manner in which the controller 100 determines the coverage factor of each coil $20_1$-$20_n$ is not described herein insofar as any known technique may be used. The coverage factor matrix is then processed according to the described method to identify the different cookware items.

The coverage factor for each coil is defined as the fraction of the area of the coil that is covered by an overlying cookware item. In FIG. 2 and following, this fraction is expressed as a percentage. It is understood that other information related to the coverage factor can be used instead, such as, but not limited to, inductance, resistance, or power factor.

This method 200 may be referred to herein as a pseudo-Voronoi method that is based on the Voronoi diagram for the partition of the plane into distinct regions: given a predetermined group of starting points called seeds, for each seed there is a region comprising all points in the plane closer to that seed than to any other.

The method 200 presupposes that the coverage factors of the coils $20_1$-$20_n$ have already been acquired, and therefore takes as input a coverage factor matrix containing the coverage factors of each individual coil $20_1$-$20_n$ in the induction cooktop 10 in step 202. As described further below, the method 200 uses the local maxima of the coverage factor matrix as starting points, and clusters the coils $20_1$-$20_n$ in regions closest to each of the local maxima.

The surface of the cooktop 10 is associated with a coordinate system apt to describe a 2D surface, for example, but not limited to, a Cartesian coordinate system with origin in the lower left corner of the cooktop surface, with the x axis oriented horizontally towards the right and the y axis oriented vertically towards the back.

Figure 5:
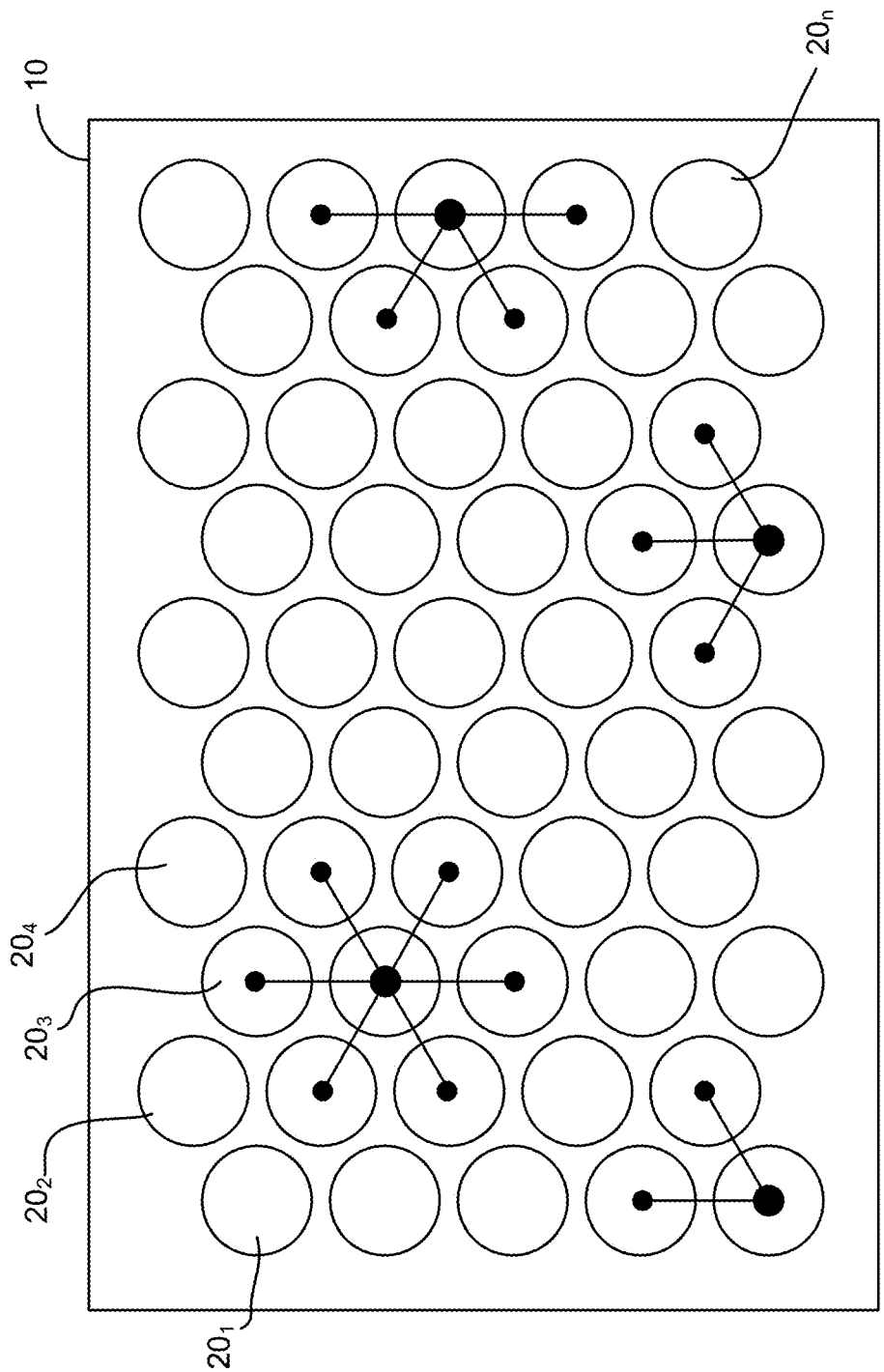
FIG. 5 is a top view of the induction cooktop of FIG. 1 showing neighboring coils.

The next step 204 of the algorithm is the identification of the local maxima in the coverage factor matrix, carried out by comparing the coverage factor of each coil $20_1$-$20_n$ with that of all adjacent coils $20_1$-$20_n$. It is important to remember that the coverage factor is stored in a coverage factor matrix for ease of processing, and does not reflect the physical arrangement of the coils $20_1$-$20_n$; therefore, adjacent coils $20_1$-$20_n$ are not simply those neighboring in the same column or row in the coverage factor matrix, but one may take into account the so-called adjacency matrix. The adjacency matrix describes, for each pair of coils $20_1$-$20_n$, whether they are adjacent or not, and depends only on the geometry of the induction cooktop 10 and the arrangement of the coils $20_1$-$20_n$, and is therefore fixed from the point of view of the algorithm. In particular, for the current geometry the adjacency matrix describes a triangular grid, in which each coil $20_1$-$20_n$ is, in general, adjacent to its six closest neighbors, as shown in FIG. 5. For coils $20_1$-$20_n$ placed near the side or on the corner, the number of adjacent neighbors is lower.

In FIG. 5, each coil $20_1$-$20_n$ indicated by a large dot is adjacent to its, at most, six closest neighbors, indicated by the smaller dots and connected via line segments. Coils $20_1$-$20_n$ on the sides or on the corners have fewer adjacent neighbors.

Figure 6A:
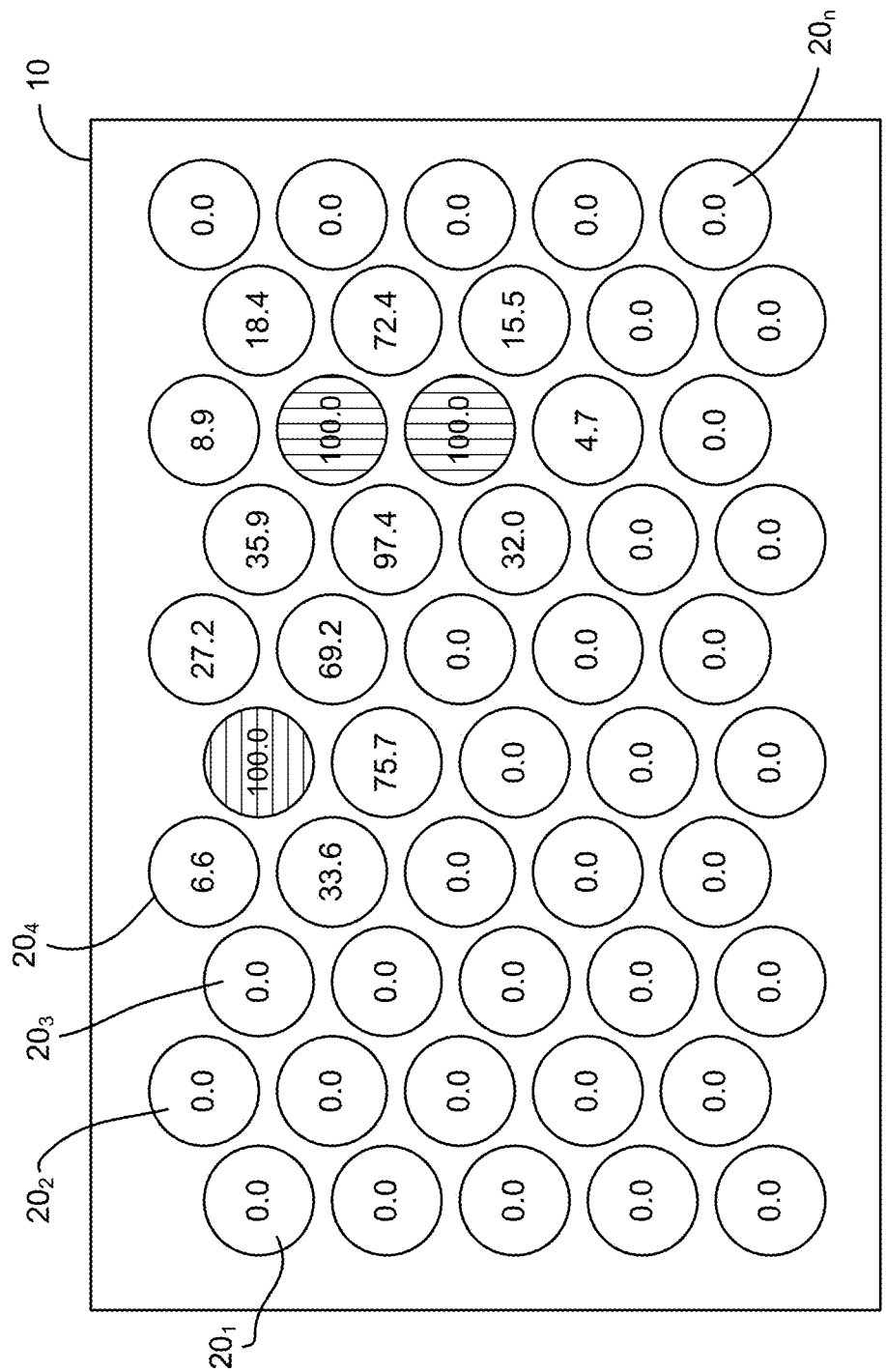
FIG. 6A is a top view of the induction cooktop of FIG. 1 shown with local maxima identified.

In the simplest case, a local maximum corresponds to the coverage factor of one coil that is higher than to the coverage factors of its adjacent coils $20_1$-$20_n$. In more complex cases, it is possible that two or more adjacent coils $20_1$-$20_n$ all have the same coverage factor, while all remaining adjacent coils have a lower coverage factor; in actual embodiments, a predefined tolerance band around the maximum coverage factor is used in order to take into consideration coils whose coverage factor might be lower than the maximum due to tolerances, electrical noise, and the like. In this situation, it is necessary to first identify all the coils $20_1$-$20_n$ that have the corresponding coverage factor, or whose coverage factors fall into the aforementioned tolerance band, and that form a single, contiguous region. For instance, the tolerance band could be in the order of 5%. This distinction is used in the calculation of the coordinates of the local maxima. An example of the two cases is shown in FIG. 6A: the simple case on the left, and the more complex case on the right.

Figure 6B:
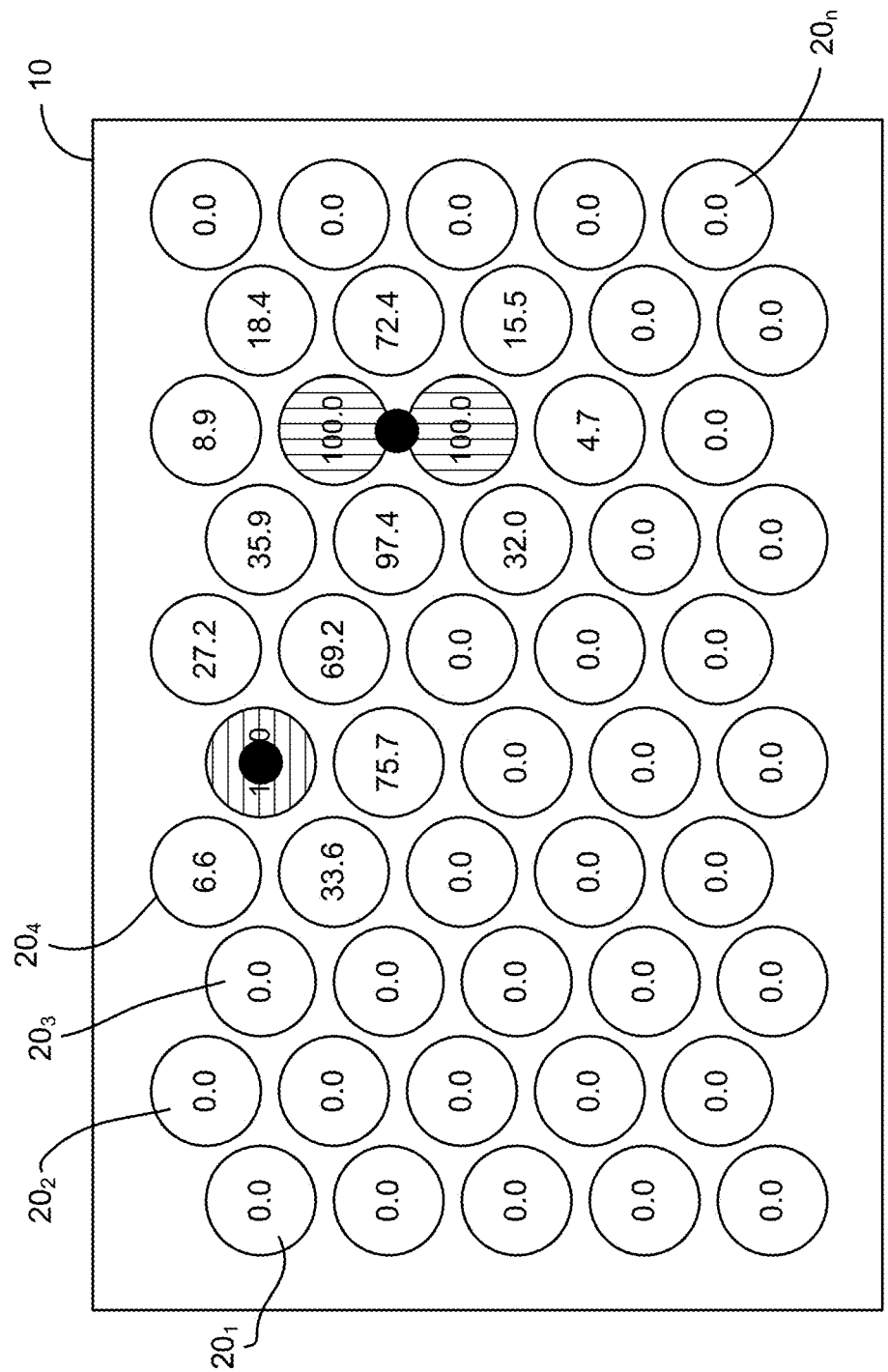
FIG. 6B is a top view of the induction cooktop of FIG. 1 shown with centroids of the local maxima identified.

The algorithm then calculates the coordinate of each local maximum in step 206. In the simple case listed above, the local maximum coordinates are simply those of the center of the corresponding coil $20_1$-$20_n$. In the other case, the coordinates are calculated as those of the centroid of the identified contiguous region, using the formulas:

$$x_c = \frac{1}{N}\sum_{k=1}^{N} x_i \cdot c_i \quad y_c = \frac{1}{N}\sum_{k=1}^{N} y_i \cdot c_i$$

where $x_c$, $y_c$ are the coordinates of the centroid, N is the number of coils considered in the calculation for this particular centroid, $x_i$, $y_i$ are the coordinates of the ith coil, and $c_i$ the coverage factor for the ith coil. An example is shown in FIG. 6B, where the larger dots represent the calculated centroids for each local maximum.

Figure 6C:
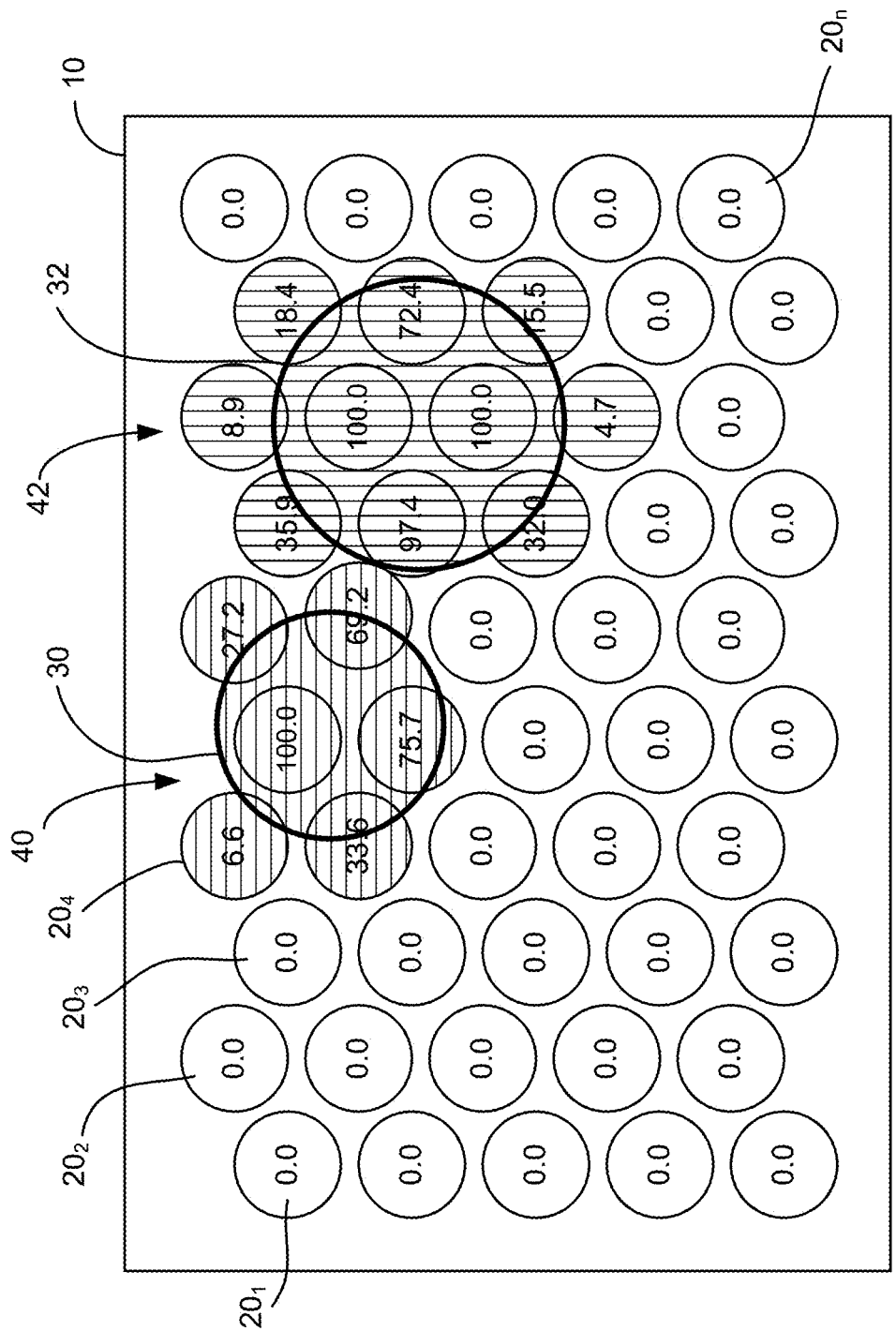
FIG. 6C is a top view of the induction cooktop of FIG. 1 shown with a correct estimate of the size, shape, orientation, and position of the cookware items shown in FIG. 2A.

Once the local maxima have been identified and their coordinates calculated, they are treated as the seeds of the Voronoi partition of the plane; in a non-limiting example, the partition considers only the coil centers as points to be clustered. To do that, in step 208 the algorithm calculates, for each coil, the distance between its center and each of the local maxima identified in step 206. The minimum distance is identified in step 210, and each coil is assigned to the closest identified local maximum, thus clustering the coils into distinct groups around the local maxima in step 212. An example is shown in FIG. 6C.

In the particular example shown, the controller 100 identifies two different coil clusters 40 and 42, indicated by different hatching. Each coil cluster 40 and 42 corresponds to one of the cookware items 30 and 32 placed on the induction cooktop 10, indicated by the thick-bordered circles. Each cluster of coil clusters 40 and 42 is used to identify the cookware items 30 and 32; in particular, it is used to estimate the center position, the shape, the size, and the orientation in step 214.

For each cluster, the centroid is identified by calculating the weighted sum of the coordinates of the centers of all the coils belonging to said cluster, wherein the weights are the coverage factors of each coil:

$$x_0 = \frac{\sum_{k=1}^{N} x_i \cdot c_i}{\sum_{k=1}^{N} c_i}, \quad y_0 = \frac{\sum_{k=1}^{N} y_i \cdot c_i}{\sum_{k=1}^{N} c_i}$$

where $x_0$, $y_0$ are the coordinates of the centroid, N is the number of coils considered in the calculation for this particular centroid, i.e. the number of coils belonging to the cluster, $x_i$, $y_i$ are the coordinates of the ith coil, and $c_i$ the coverage factor for the ith coil. The centroid coordinates calculated here are used as the estimation for the center position of the corresponding cookware item.

In order to estimate the size of each cookware item, one possible way is to first calculate the weighted area of the corresponding cluster. One possible way of performing this calculation is to sum the areas of all coils belonging to the cluster, adjusted by a factor the takes into account the empty areas between coils, weighted by the corresponding coverage factors:

$$A_{cluster} = \sum_{i=1}^{N} K \cdot A_{coil} \cdot c_i$$

where $A_{cluster}$ is the area estimation for the cluster, N is the number of coils belonging to the cluster, K is an adjusting factor, $A_{coil}$ is the area of the ith coil, and $c_i$ is the coverage factor for the ith coil. The information on the area of the cluster can be used to estimate the radius of the cookware item, in case the cookware item is circular:

$$r = \sqrt{\frac{A_{cluster}}{\pi}}$$

where r is the estimation for the radius of the cookware item, and $A_{cluster}$ is the area estimation for the cluster just calculated.

Another possible way to estimate the size of each cookware item, is first calculate the second moments of area and the product of inertia. One possible way of performing this calculation is to consider cartesian axes, passing through the center of the cookware item, and parallel to the axes of the reference coordinate system defined in § 0036. The moments can be calculated as:

$$I_{xx} = \sum_{i=1}^{N} c_i \cdot [I_{x_{coil}} + A_{coil}(y_{c_i} - y_0)^2]$$

$$I_{yy} = \sum_{i=1}^{N} c_i \cdot [I_{y_{coil}} + A_{coil}(x_{c_i} - x_0)^2]$$

$$I_{xy} = \sum_{i=1}^{N} c_i \cdot [I_{xy_{coil}} + A_{coil}(x_{c_i} - x_0)(y_{c_i} - y_0)]$$

where $I_{xx}$ is the second moment of area relative to the x-axis, $I_{yy}$ is the second moment of area relative to the y-axis, and $I_{xy}$ is equivalent to the product of inertia; $I_{x_{coil}}$ is the second moment of area for the coils shape relative to the x-axis, $I_{y_{coil}}$ is the second moment of area for the coil shape relative to the y-axis, and $I_{xy_{coil}}$ is the equivalent to the product of inertia for the coils shape; $A_{coil}$ is the area of each coil, $x_{c_i}$ is the x coordinate for the center of the ith coil, and $y_{c_i}$ is the y coordinate for the center of the ith coil, $x_0$ is the x coordinate for the estimated center of the cookware item, $y_0$ is the y coordinate for the estimated center of the cookware item, and $c_i$ is the coverage factor for the ith coil.

Next step is to calculate the principal moments and the angle of rotation; the principal moments are oriented along the main directions of the shape, and can be calculated as:

$$I_{I,II} = \frac{I_{xx} + I_{yy}}{2} \pm \sqrt{\left(\frac{I_{xx} - I_{yy}}{2}\right)^2 + I_{xy}^2}$$

$$\theta = \frac{1}{2}\arctan\left(-\frac{2I_{xy}}{I_{xx} - I_{yy}}\right)$$

where $I_I$ and $I_{II}$ are the principal moments, and $\theta$ is the rotation angle of the cookware item relative to the axes of the reference coordinate system.

Finally, using the calculated principal moments, it is possible to estimate the major and minor semiaxes of the cookware item, in case the cookware item is elliptical:

$$a = \sqrt[4]{\frac{4}{\pi}I_I\sqrt{\frac{I_I}{I_{II}}}}$$

$$b = \sqrt[4]{\frac{4}{\pi}I_{II}\sqrt{\frac{I_{II}}{I_I}}}$$

where a is the major semiaxis and b is the minor semiaxis of the cookware item.

A typical method to estimate the shape is to consider the ratio between the two semiaxes a and b just calculated: if the two values of a and b are the same, the ratio is 1 and the shape is circular; if they are different, the ratio is other than 1 and the shape is elliptical. Due to the uncertainty in the estimation and calculation of the values of the major and minor semiaxes, it is typical to compare the ratio/with a predefined threshold, and if the ratio is larger than this threshold consider the shape as elliptical, whereas if the ratio is smaller than this threshold the shape is considered as circular.

For efficiency reasons, it may be advantageous to limit this process to coils whose coverage factor is higher than a predefined threshold, since coils with a small coverage factor would have a negligible contribution either to the identification of the position, shape, size, and orientation of a cookware item, or to the heating of the cookware item itself.

Figure 7:
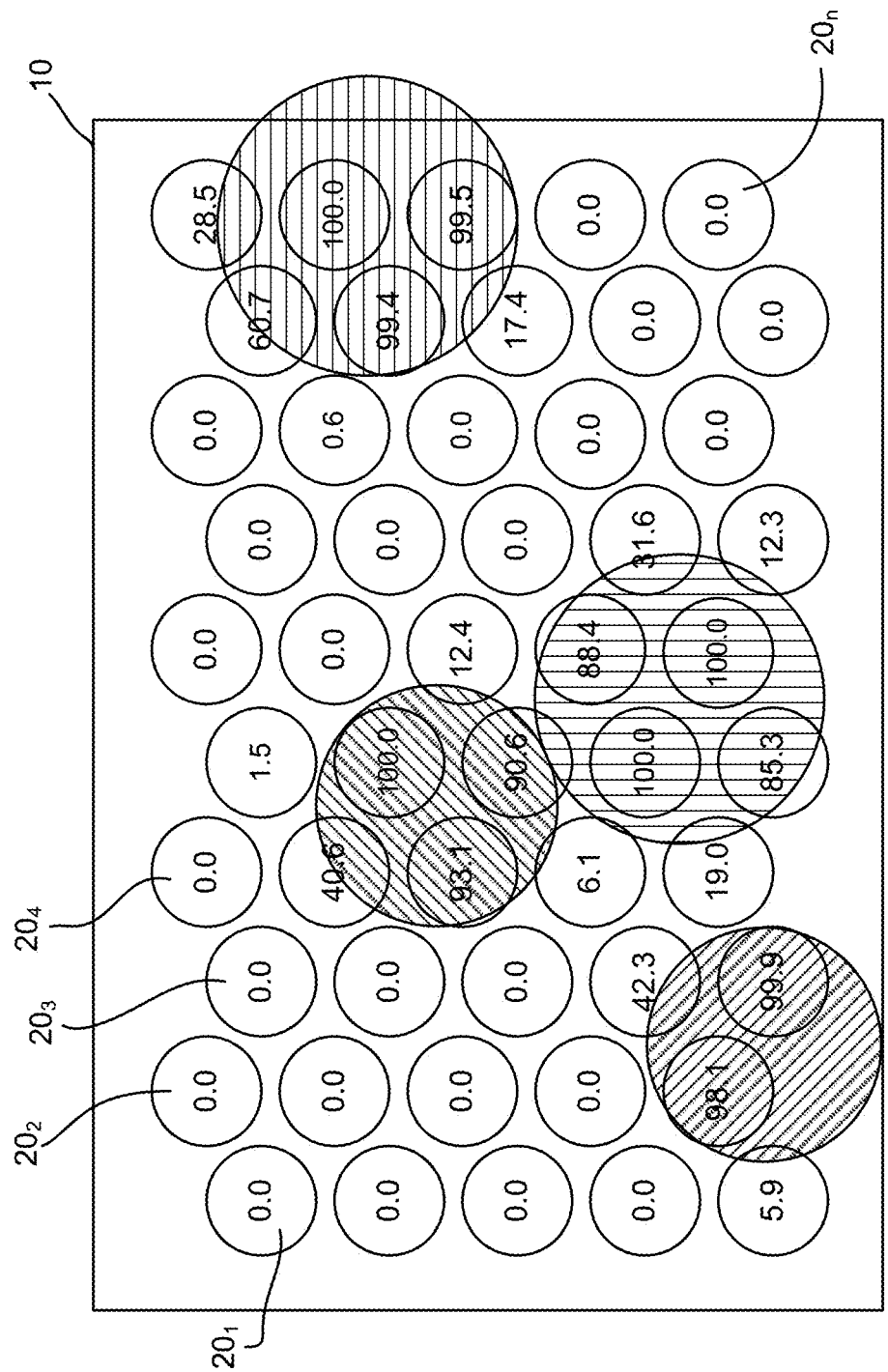
FIG. 7 is a top view of the induction cooktop of FIG. 1 shown with four cookware items thereon with the coverage factors of each coil indicated.

In the following paragraphs, another example of the method operation is detailed, applied to the pots placed on top of the cooktop as shown in FIG. 7. FIG. 7 shows 4 pots placed on the cooktop, in particular two of the pots are actually touching each other.

Figure 8:
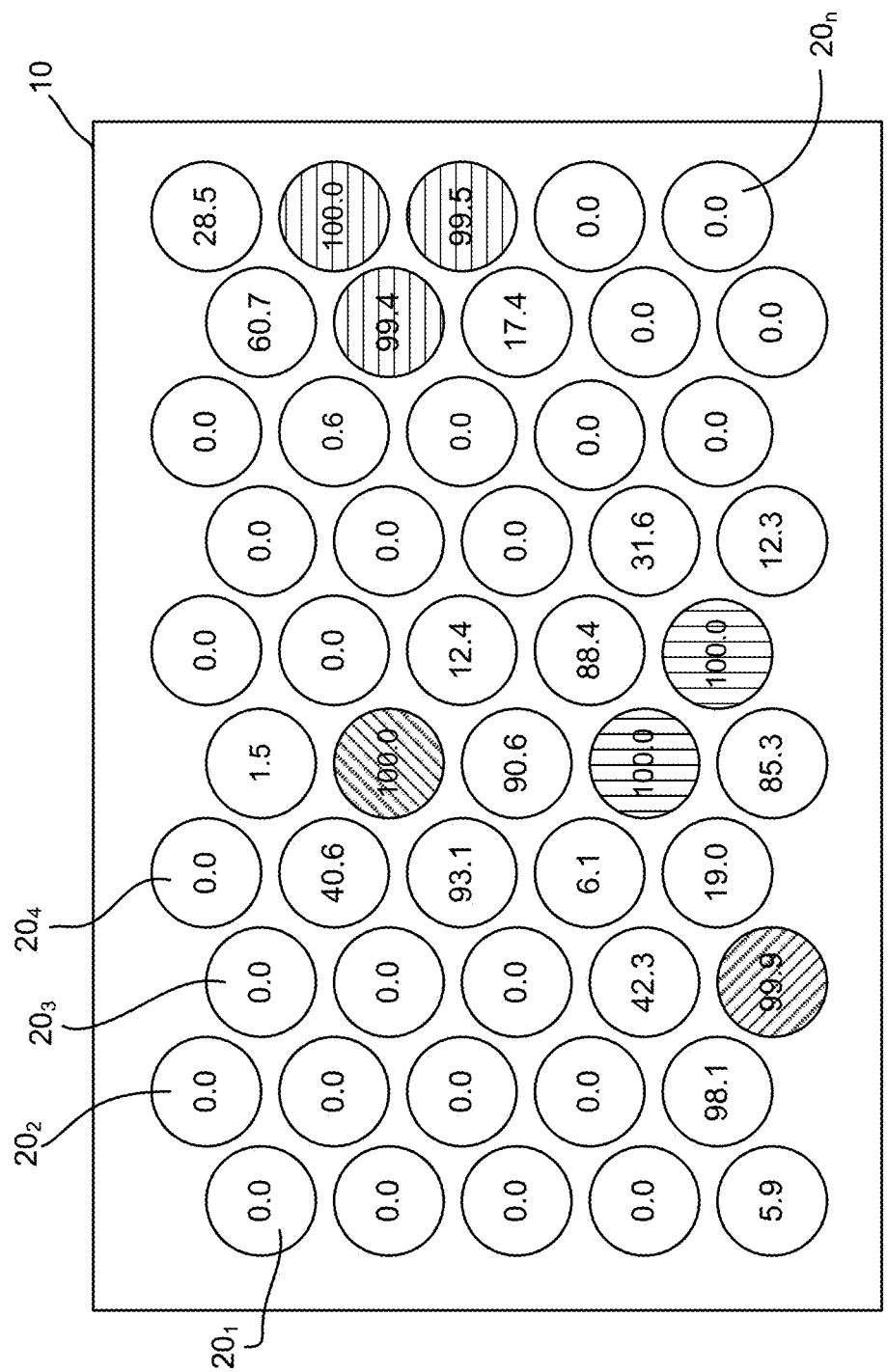
FIG. 8 is a top view of the induction cooktop of FIG. 1 shown with the groups of coils used for the determination of the local maxima.

FIG. 8 shows the separate groups of coils used to determine the local maxima, in either the simple case where a single coil represents a local maximum of the coverage factor, and the more complex case with a contiguous region of coils having the same value, within a predefined threshold.

Figure 9:
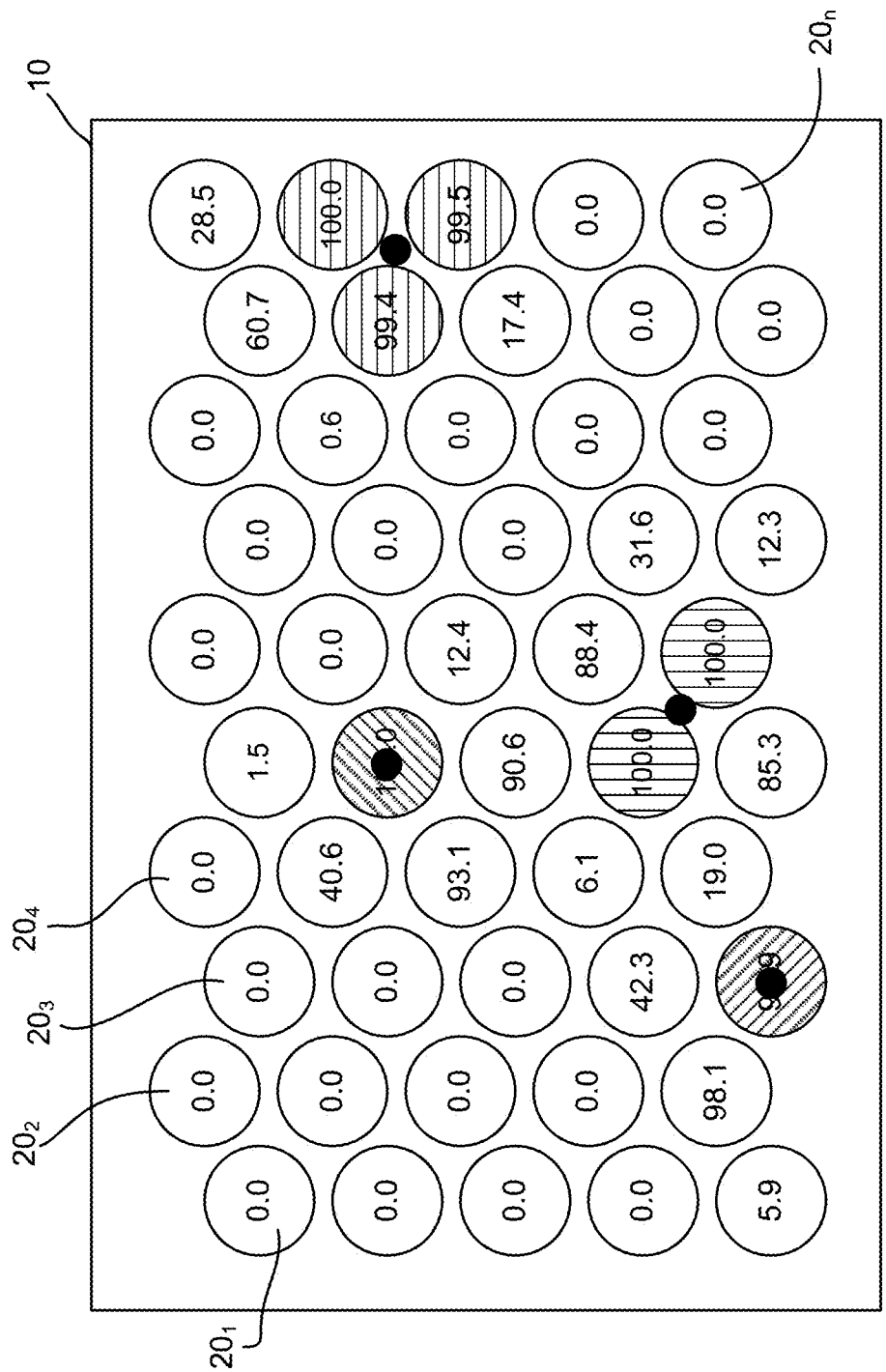
FIG. 9 is a top view of the induction cooktop of FIG. 1 shown with centroids of the local maxima identified.

FIG. 9 shows the actual location of the local maxima, calculated from the groups of coils identified and shown in FIG. 8.

Figure 10:
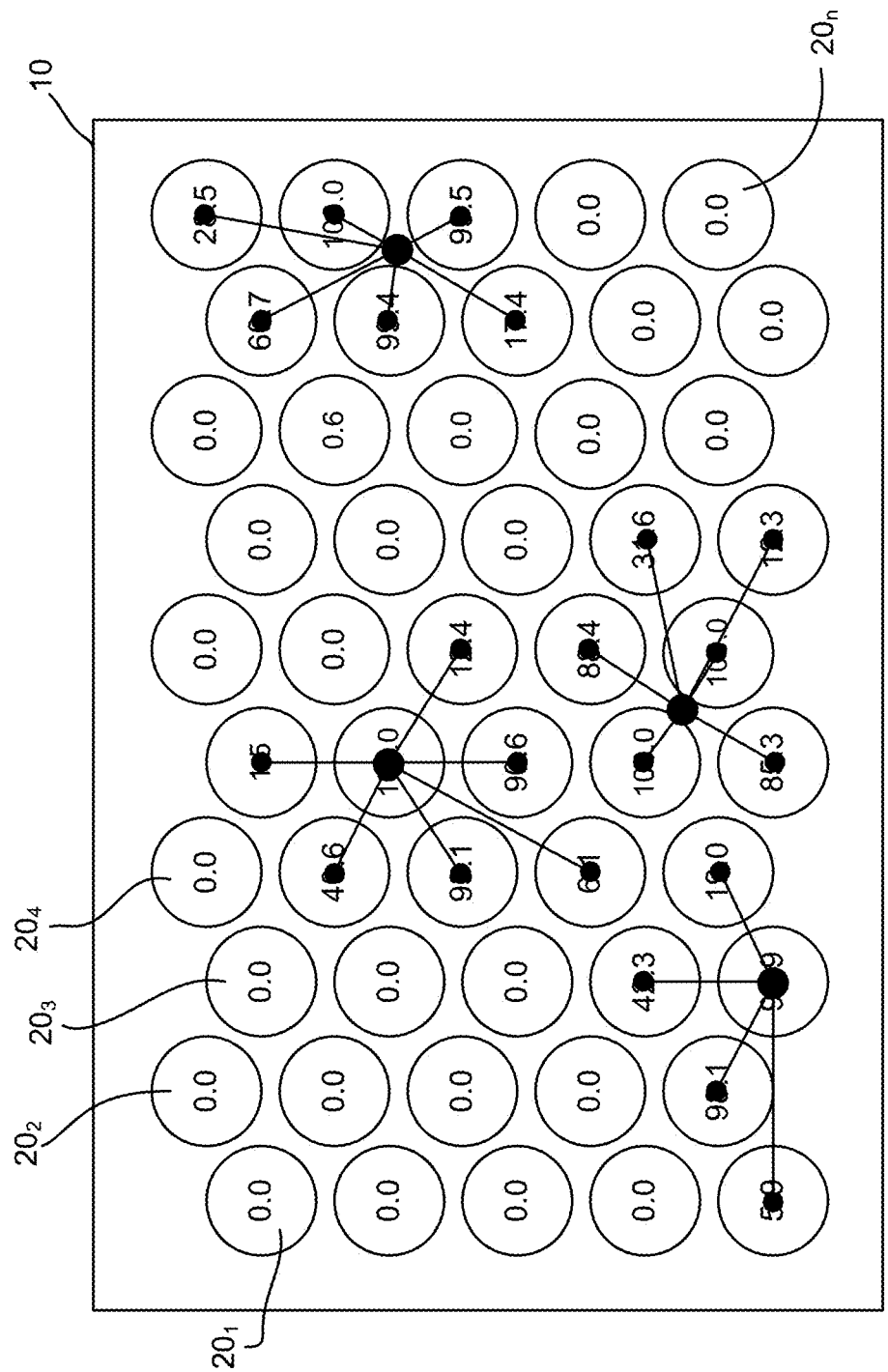
FIG. 10 is a top view of the induction cooktop of FIG. 1 shown with the association of each coil with the closest local maxima for the determination of the clusters.

FIG. 10 shows, for each coil whose coverage factor exceeds a predefined threshold, which is the closest local maxima. In this case, as a non-limiting example, the distance is calculated from the center of each coil to the location of the local maxima. All the coils which are shown as connected to the same local maxima will then be grouped in the same cluster.

Figure 11:
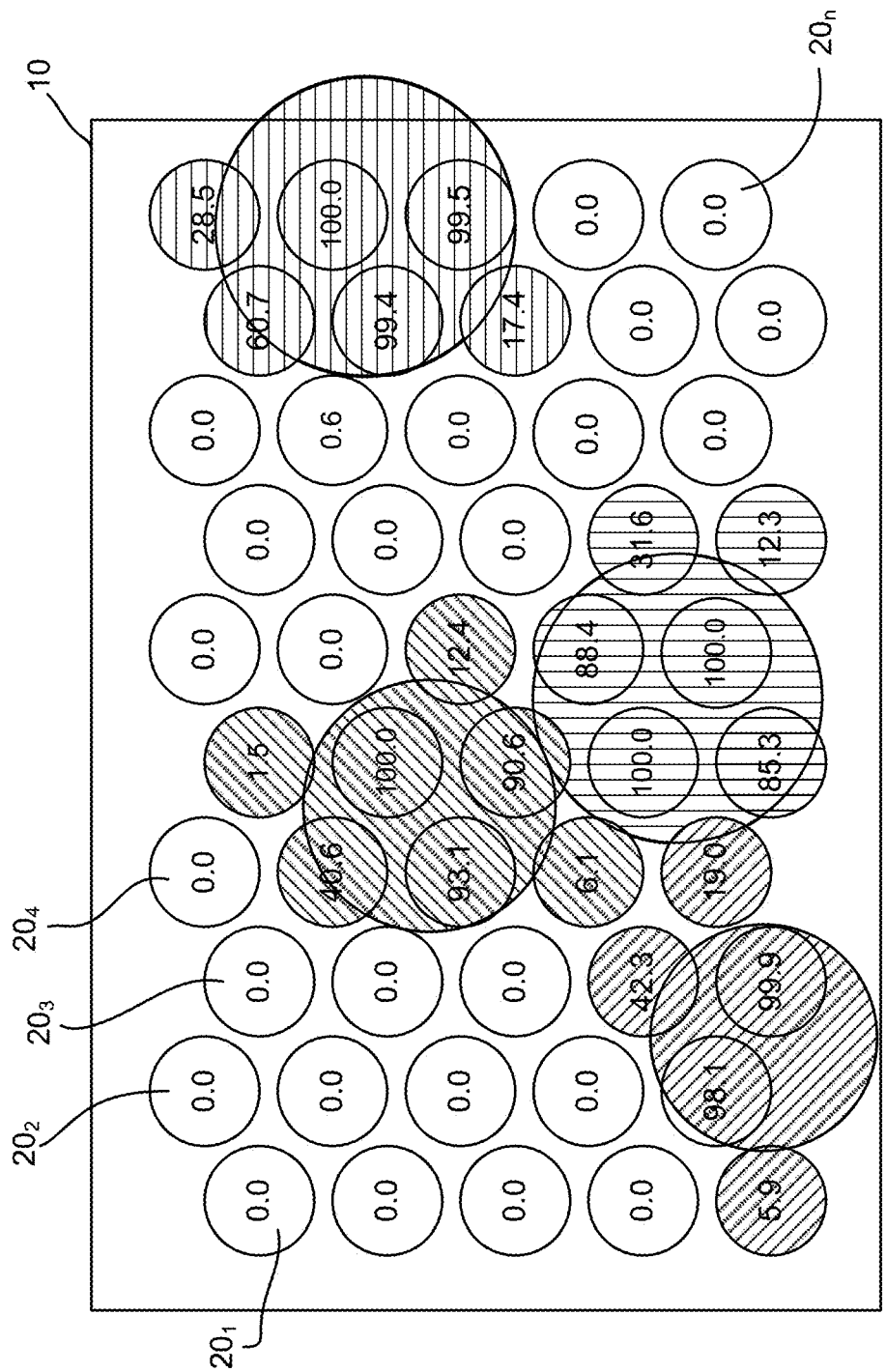
FIG. 11 is a top view of the induction cooktop of FIG. 1 shown with the coil clusters and the corresponding estimation of the cookware items.

FIG. 11 finally shows the coil clusters, as determined in FIG. 10, with the corresponding estimated cookware items.

Once the geometrical characteristics of the cookware item have been estimated, namely center position, shape, size, and orientation, the system can use this information to display a visual representation of the cookware items on the user interface 104.

The user can then select a first power level input for at least one of the identified cookware items, said first power level input being set by a user through the user interface 104, or any other means.

The system will then assign a second power level to each coil belonging to a cluster derived from the first power level input received from the user, said second power level being determined and set by the controller; this second power level can be set in many different ways. A non-limiting example is to divide the first power level equally among all the coils belonging to the cluster, for example if the first power level is 1200 W and the cluster is composed of 6 coils, the second power level for each coil would be 200 W. Another non-limiting example would be to determine the second power level proportionally to the coverage factor. Other criteria are easily determinable by people skilled in the art.

Finally, the system will control the power delivery to the coils belonging to the identified coil cluster corresponding to the selected cookware item, in order to deliver the first power level requested by the user to the selected cookware item.

Compared to known solutions, clustering of coils allows to discriminate between adjacent cookware items directly, with no need to further process an area previously identified as it happens e.g. in the case of EP2242328 and EP2112865.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method of identifying cookware items placed on top of an induction cooktop having a plurality of coils, a power supply, and a controller for controlling the amount of power supplied to the coils from the power supply, the controller configured to execute the following steps comprising:
    a) collect information related to a coverage factor indicative of a degree of overlap between a cookware item and a coil for each coil and store the information into a coverage factor matrix;
    b) identify one or more local maxima in the coverage factor matrix, wherein said local maxima correspond to the coverage factor of one or more coils that is or are higher than the coverage factors of adjacent coils;
    c) identify coordinates of each of the local maxima as follows, wherein said coordinates are referred to a geometric coordinate system of said induction cooktop:
        i. when the local maxima is associated with a single coil, the coordinates are those of a center of a single coil, and
        ii. when the local maxima is associated with adjacent coils, the coordinates are those of a centroid of a region corresponding to the adjacent coils;
    d) calculate distances from each coil to each of the coordinates of the identified local maxima;
    e) for each coil, determine a minimum among the distances;
    f) group the coils in clusters, based on the distances from the local maxima; and
    g) use the coil clusters to estimate a position, shape, size, and orientation of the cookware items.

2. The method of claim 1, wherein step d) includes calculating the distance from a center of each coil to the coordinates of the identified local maxima.

3. The method of claim 1, wherein step c)ii) includes calculating the coordinates of the centroid of the region using the formulas:

$$x_c = \frac{1}{N}\sum_{k=1}^{N} x_i \cdot c_i \quad y_c = \frac{1}{N}\sum_{k=1}^{N} y_i \cdot c_i$$

where $x_c$, $y_c$ are the coordinates of the centroid, N is a number of adjacent coils considered in the calculation for this particular centroid, $x_i$, $y_i$ are the coordinates of the ith coil, and $c_i$ is a quantity proportional to the coverage factor for the ith coil.

4. The method of claim 1, wherein the position estimated at step g) corresponds to the coordinates of the centroid of the cluster of coils.

5. The method of claim 1, wherein the size of a cookware item estimated at step g) is calculated based on a sum of the areas of all coils belonging to a cluster, said sum being weighted by using the coverage factors of the coils belonging to said cluster.

6. The method of claim 1, wherein step g) entails calculating with respect to the geometric coordinate system of the induction cooktop:
    the second moments of area and the product of inertia of each cluster;
    the principal moments and their angles of rotation;
    the major and minor semiaxes of the cookware item.

7. The method of claim 6, wherein estimation of the shape at step g) is based on a ratio between the major and minor semiaxes of the cookware item.

8. The method of claim 6, wherein estimation of the orientation of a cookware item is based on said angle of rotation.

9. The method of claim 1, further comprising the following steps:
    h) receiving a first power level input for at least one of the identified cookware items, said first power level input being set by a user through a user interface;
    i) assigning a second power level to each coil belonging to a cluster derived from the first power level input received at step h); and
    j) controlling power delivery to the identified coil clusters associated with each cookware item.

10. The method of claim 1 further comprising a step of displaying identified cookware items on a user interface.

11. An induction cooktop system comprising:
an induction cooktop including a plurality of inductive coils;
a power supply for supplying power to selected ones of the plurality of inductive coils; and
a controller configured to perform the following steps:
   a) collect information related to a coverage factor indicative of a degree of overlap between a cookware item and a coil for each coil and store the information into a coverage factor matrix;
   b) identify one or more local maxima in the coverage factor matrix, wherein said local maxima correspond to the coverage factor of one or more coils that is or are higher than the coverage factors of adjacent coils;
   c) identify coordinates of each of the local maxima as follows, wherein said coordinates are referred to a geometric coordinate system of said induction cooktop:
      i. when the local maxima is associated with a single coil, the coordinates are those of a center of a single coil, and
      ii. when the local maxima is associated with adjacent coils, the coordinates are those of a centroid of a region corresponding to the adjacent coils;
   d) calculate distances from each coil to each of the coordinates of the identified local maxima;
   e) for each coil, determine a minimum among the distances;
   f) group the coils in clusters, based on the distances from the local maxima; and
   g) use the coil clusters to estimate a position, shape, size, and orientation of the cookware items.

12. The system of claim 11 and further including a user interface in communication with the controller, wherein the user interface is adapted to display at least one among the position, size, shape and orientation of the cookware.

13. The system of claim 11, and further comprising the step of h) supplying power to the coils underlying the cookware items.

14. The system of claim 11, wherein step b) includes identifying all local maxima in the coverage factor matrix by comparing the coverage factor of each coil with that of all adjacent coils.

15. The system of claim 14, wherein step b) includes identifying all local maxima in the coverage factor matrix by comparing the coverage factor of each coil with that of all adjacent coils.

16. A method of identifying cookware items placed on top of an induction cooktop having a plurality of coils, a power supply, and a controller for controlling the amount of power supplied to the coils from the power supply, the controller configured to execute the following steps comprising:
   a) acquire coverage factor information indicative of a degree of overlap between a cookware item and a coil for each coil and collect the coverage factor information into a coverage factor matrix;
   b) identify all local maxima in the coverage factor matrix;
   c) find the coordinates of each of the local maxima as follows:
      i) when the local maxima is a single coil, the coordinates are those of a center of a single coil, and
      ii) when the local maxima is a region of adjacent coils, calculating the coordinates of a centroid of the region using the formulas:

$$x_c = \frac{1}{N}\sum_{k=1}^{N} x_i \cdot c_i \quad y_c = \frac{1}{N}\sum_{k=1}^{N} y_i \cdot c_i$$

where $x_c$, $y_c$ are the coordinates of the centroid, N is a number of adjacent coils considered in the calculation for this particular centroid, $x_i$, $y_i$ are the coordinates of the ith coil, and $c_i$ the coverage factor for the ith coil;
   d) calculate distances from a center of each coil to each of the coordinates of the identified local maxima;
   e) for each coil, determine a minimum among the distances;
   f) classify the coils in clusters, based on the distances from the local maxima; and
   g) use the identified coil clustering to estimate a position, shape, size, and orientation of the cookware items.

17. The method of claim 16, and further comprising the step of h) supplying power to the coils underlying the cookware items.

18. The method of claim 16, wherein step b) includes identifying all local maxima in the coverage factor matrix by comparing the coverage factor of each coil with that of all adjacent coils.

* * * * *